United States Patent
Griffis et al.

(10) Patent No.: US 10,814,280 B2
(45) Date of Patent: Oct. 27, 2020

(54) STRUCTURES FOR NORMALIZING MULTI-PLANAR FLOW DISTRIBUTION WITHIN AN ELECTROCHEMICAL SEPARATION SYSTEM

(71) Applicant: Evoqua Water Technologies LLC, Lowell, MA (US)

(72) Inventors: Joshua Griffis, Ashburnham, MA (US); Li-Shiang Liang, Harvard, MA (US)

( * ) Notice: Subject to any disclaimer, the term of this patent is extended or adjusted under 35 U.S.C. 154(b) by 213 days.

(21) Appl. No.: 15/567,398

(22) PCT Filed: Apr. 22, 2016

(86) PCT No.: PCT/US2016/028912
§ 371 (c)(1),
(2) Date: Oct. 18, 2017

(87) PCT Pub. No.: WO2016/172526
PCT Pub. Date: Oct. 27, 2016

(65) Prior Publication Data
US 2018/0111093 A1    Apr. 26, 2018

Related U.S. Application Data

(60) Provisional application No. 62/152,102, filed on Apr. 24, 2015.

(51) Int. Cl.
| | |
|---|---|
| *C02F 1/469* | (2006.01) |
| *B01D 61/46* | (2006.01) |
| *B01D 61/48* | (2006.01) |
| *B01D 61/50* | (2006.01) |
| *B01D 61/52* | (2006.01) |
| *B01D 61/42* | (2006.01) |
| *B01D 25/26* | (2006.01) |

(52) U.S. Cl.
CPC ............ *B01D 61/52* (2013.01); *B01D 61/46* (2013.01); *B01D 61/48* (2013.01); *B01D 61/50* (2013.01); *C02F 1/4693* (2013.01); *C02F 1/4695* (2013.01); *B01D 2313/08* (2013.01); *B01D 2313/10* (2013.01); *B01D 2313/105* (2013.01); *B01D 2313/12* (2013.01); *B01D 2313/125* (2013.01)

(58) Field of Classification Search
CPC ............ B01D 2313/08; B01D 2313/10; B01D 2313/105; B01D 2313/12; B01D 2313/125; B01D 61/46; B01D 61/48; B01D 61/50; B01D 61/52; C02F 1/4693; C02F 1/4695
See application file for complete search history.

(56) References Cited

U.S. PATENT DOCUMENTS

| | | | |
|---|---|---|---|
| 4,350,581 A | 9/1982 | Schmoldt et al. | |
| 5,292,422 A | 3/1994 | Liang et al. | |
| 6,245,453 B1 | 6/2001 | Iwase et al. | |
| 2016/0009573 A1* | 1/2016 | Liang | B01D 61/50 204/635 |

FOREIGN PATENT DOCUMENTS

WO    2014142944 A1    9/2014

* cited by examiner

*Primary Examiner* — Salil Jain

(57) ABSTRACT

A module comprises a cell stack having a plurality of alternating ion depleting compartments and ion concentrating compartments, an inlet manifold configured to facilitate a flow of fluid into the cell stack, and a first flow distribution system, associated with the inlet manifold, including a first ramp to promote the circulation of the flow of fluid into the cell stack.

11 Claims, 15 Drawing Sheets

STRUCTURES FOR NORMALIZING MULTI-PLANAR FLOW DISTRIBUTION WITHIN AN ELECTROCHEMICAL SEPARATION SYSTEM

CROSS-REFERENCE TO RELATED APPLICATIONS

This application is a U.S. national phase application, and claims the benefit of priority under 35 U.S.C. § 371, of International (PCT) Patent Application Serial No. PCT/US2016/028912, titled "STRUCTURES FOR NORMALIZING MULTI-PLANAR FLOW DISTRIBUTION WITHIN AN ELECTROCHEMICAL SEPARATION SYSTEM", filed on Apr. 22, 2016, which in turn claims the benefit under 35 U.S.C. § 119(e) to U.S. Provisional Patent Application Ser. No. 62/152,102, titled "NOVEL STRUCTURES FOR NORMALIZING MULTI-PLANAR FLOW DISTRIBUTION WITHIN A PLENUM", filed Apr. 24, 2015, which is hereby incorporated herein by reference in its entirety for all purposes.

FIELD OF THE DISCLOSURE

Aspects relate generally to electrochemical separation and, more particularly, to flow distribution in electrochemical separation systems.

SUMMARY

In accordance with one or more aspects, a module may comprise a cell stack having a plurality of alternating ion depleting compartments and ion concentrating compartments, an inlet manifold configured to facilitate a flow of fluid into the cell stack, and a first flow distribution system, associated with the inlet manifold, including a first ramp to promote the circulation of the flow of fluid into the cell stack.

In some embodiments, the first flow distribution system further comprises a plurality of radially spaced baffles. In some embodiments, the plurality of radially spaced baffles comprise at least one of ribs and teeth.

In some embodiments, the first ramp is positioned on at least one of a bottom and a top of the first flow distribution system.

In some embodiments, the first flow distribution system is configured to promote uniform fluid distribution to the cell stack.

In some embodiments, the first flow distribution system comprises a plurality of first ramps. In some embodiments, the plurality of first ramps are spaced to define first grooves.

In some embodiments, the first flow distribution system further comprises an outlet manifold configured to facilitate flow of fluid out of the cell stack. In some embodiments, the module further comprises a second flow distribution system associated with the outlet manifold. In some embodiments, the second flow distribution system comprises a second ramp. In some embodiments, the second ramp is positioned on at least one of a bottom and a top of the second distribution system. In some embodiments, the second flow distribution system comprises a plurality of second ramps. In some embodiments, the first and second ramp have different radii of curvature. In some embodiments, the plurality of ramps are spaced to define grooves.

In accordance with one or more aspects, a method may facilitate uniform fluid flow distribution in an electrochemical separation apparatus having a cell stack comprising a plurality of alternating ion depleting compartments and ion concentrating compartments. The method may comprise providing a first flow distribution system in fluid communication with the cell stack, the first flow distribution system comprising a first ramp to promote the redirection of fluid flow into the cell stack.

In some embodiments, the method further comprises providing an inlet manifold associated with the first flow distribution system. In some embodiments, providing the first flow distribution system comprises inserting the first flow distribution system into the inlet manifold. In some embodiments, providing the first flow distribution system comprises providing an inlet manifold having an injection molded first flow distribution system.

In some embodiments, the method further comprises providing a plurality of radially spaced baffles in the first flow distribution system. In some embodiments, providing a plurality of radially spaced baffles comprises providing at least one of ribs and teeth. In some embodiments, the first flow distribution system comprises a plurality of first ramps. In some embodiments, the plurality of first ramps are spaced to define first grooves.

In some embodiments, the method further comprises providing an outlet manifold in fluid communication with the electrochemical separation apparatus.

In some embodiments, the method further comprises providing a second flow distribution system associated with the second manifold. In some embodiments, providing the second flow distribution system comprises inserting the second flow distribution system into the outlet manifold. In some embodiments, providing the second flow distribution system comprises providing an outlet manifold having an injection molded second flow distribution system.

In accordance with one or more aspects, a flow distribution system may comprise a ramp to promote the redirection of fluid flow towards an electrochemical cell stack.

In some embodiments, the system further comprises a plurality of ramps. In some embodiments, the plurality of ramps are spaced to define grooves.

In some embodiments, the system further comprises a plurality of radially spaced baffles. In some embodiments, the radially spaced baffles comprise at least one of ribs and teeth.

In some embodiments, the system is configured to be received or integrated into a frame of an electrochemical separation module housing the cell stack. In some embodiments, the system achieves less than about 20% deviation in fluid velocity among points along various fluid passageways within the cell stack.

In some embodiments, the system is configured to transform a fluid flow from a turbulent flow to at least one of a transition flow and a laminar flow.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
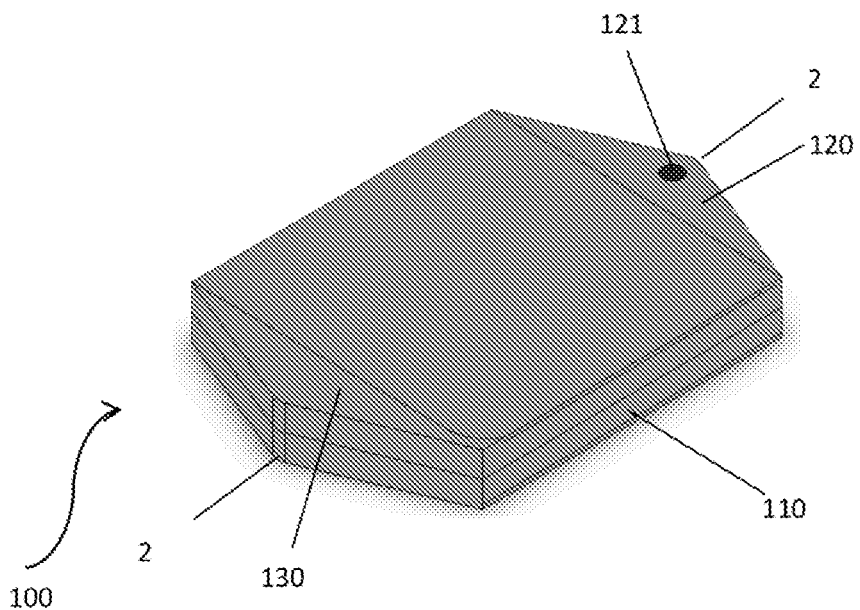
FIG. 1 is a schematic illustration of a module used in an electrochemical separation apparatus in accordance with one or more embodiments.

In accordance with one or more embodiments, electrochemical separation systems and methods may be characterized by enhanced fluid flow distribution for application in various treatment processes. In some embodiments, fluid flow distribution into or out of an electrochemical separation device may be normalized. In some specific embodiments, the flow distribution into or out of an electrochemical separation device may be uniform across all planes of the device.

Devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously or intermittently operated, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance.

Further, such electrochemical devices may comprise electrically active membranes, such as semipermeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half-cell reactions occur that initiate and/or facilitate the transfer of ions through the membranes and compartments.

The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

In some embodiments, an electrodeionization device may include an ion exchange screen. In accordance with one or more embodiments, an ion exchange screen may be a functionalized screen, such as a screen having cation and/or anion functionality. The use of ion exchange material in place of an inert screen may improve the ability of the electrodeionization device to remove ions from water when the water is dilute, for example, less than about 5000 mg/l of ionic concentration. The ion exchange material can comprise either cation exchange or anion exchange material and combinations thereof.

Each flow compartment can be sealed around the periphery by a sealing material and the screen can be placed inside the flow compartment. Alternatively the outside edges of the screen can be embedded in the sealing material around the periphery. The screen and the sealing material, such as a thermoelastic elastomer, can be assembled in a separate operation. The resulting spacer is then used to define the flow compartment, establish the distance between adjacent ion exchange membranes, and facilitate ionic transport via enhanced mixing in the compartment under a DC electric field.

The thickness of the cell stack may depend on the thickness of each compartment. In some embodiments, the thickness of each compartment of the cell stack may be about 3 mm. The thickness of each compartment of the cell stack is determined in part by the thickness of the screen, if present. The thickness of the screen may range from about 0.25 mm to about 2.0 mm Thicknesses outside the typical range given above are of course possible.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations. One or more embodiments relate to devices that may purify fluids electrically. Liquids or other fluids to be purified enter the purification device and, under the influence of an electric field, are treated to produce an ion-depleted liquid. Species from the entering liquids are collected to produce an ion-concentrated liquid.

In accordance with one or more embodiments, an electrochemical separation system or device may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include about 26 cell pairs. In some non-limiting embodiments, a modular unit may include about 50 cell pairs. In some non-limiting embodiments, a modular unit may include about 100 cell pairs. A plurality of modular units can then be assembled together to provide an overall intended number of cell pairs in an electrochemical separation device.

In some embodiments of the disclosure, a cell stack for an electrical purification apparatus is provided. The cell stack may provide a plurality of alternating ion depleting and ion concentrating compartments. Each of the ion depleting compartments may have an inlet and an outlet that provides a dilute fluid flow in a first direction. Each of the ion concentrating compartments may have an inlet and an outlet that provides a concentrated fluid flow in a second direction. In some embodiments, the first direction may be different than the second direction, such as in a cross-flow device.

The electrical purification apparatus of the present disclosure may further comprise a housing that encloses the cell stack. At least a portion of the periphery of the cell stack may be secured to the housing. A frame or support structure may be positioned between the housing and the cell stack to provide additional support to the cell stack. The frame may also comprise the inlet manifolds and outlet manifolds that allow the flow of liquid in and out of the cell stack. In some embodiments, the inlet and outlet manifolds may be reversible based on the direction of fluid flow. In some embodiments, the manifold may include a plenum.

The frame and the cell stack together may provide an electrical purification apparatus modular unit. The electrical purification apparatus may further comprise a second modular unit secured within the housing. A spacer, for example, a blocking spacer, may be positioned between the first modular unit and the second modular unit. A first electrode may be positioned at an end of the first modular unit that is opposite an end in communication with the second modular unit. A second electrode may be positioned at an end of the second modular unit that is opposite an end in communication with the first modular unit. Manifolding such as that involving the frames may service one or more modular units such that various modular units may be in fluid communication therebetween in a larger system.

In accordance with one or more embodiments, a cell stack as discussed herein may have any desired number of ion exchange membranes, cell pairs or flow compartments. In some embodiments, an electrochemical separation system may include a single cell stack. In other embodiments, such as in modular embodiments, an electrochemical separation system may include two or more cell stacks. In some embodiments, each cell stack may be included in a separate modular unit as discussed herein. Modularity may offer design flexibility and ease of manufacturability. In accordance with one or more embodiments, an electrochemical separation system may include a first electrode, a second electrode, a first electrochemical separation modular unit having a first cell stack defining a plurality of alternating depleting compartments and concentrating compartments supported by a first frame, the first electrochemical separation modular unit positioned between the first electrode and the second electrode, and a second electrochemical separation modular unit, in cooperation with the first electrochemical separation modular unit, having a second cell stack defining a plurality of alternating depleting compartments and concentrating compartments supported by a second frame, the second electrochemical separation modular unit positioned between the first electrochemical separation modular unit and the second electrode.

In accordance with one or more embodiments, an electrochemical separation modular unit may comprise a cell stack defining a plurality of alternating depleting compartments and concentrating compartments, and a support system. The support system may be configured to maintain vertical alignment of the cell stack. The support system may be a frame in some embodiments. A frame may at least partially surround the cell stack. In other embodiments, the frame may substantially surround the cell stack. In some embodiments, a frame may include a manifold system configured to facilitate fluid flow through the cell stack. The manifold system may deliver process liquid from a central system manifold to an individual modular unit that it services. A manifold system may include an inlet manifold and an outlet manifold. A manifold system may comprise an inlet manifold in fluid communication with an inlet of each depleting compartment and with an inlet of each concentrating compartment. The manifold system may further comprise an outlet manifold in fluid communication with an outlet of each depleting compartment and with an outlet of each concentrating compartment. The manifold system may be configured to deliver treated liquid downstream via the outlet manifold. At least a portion of the manifold system may be integral to the frame or in a structure separate from the frame. In at least some embodiments, the manifold system may be constructed and arranged to prevent mixing of dilute and concentrate streams in a modular unit. The manifold system may fluidly isolate and keep separated outlets of dilute and concentrate compartments associated with a stack. In some embodiments, the manifold system may include a flow distribution system. The flow distribution system may be a part of the manifold system or a separate system. The flow distribution system may be in fluid communication with the manifold system and may be configured to promote uniform flow distribution to a cell stack. The flow distribution system may be in fluid communication with an inlet of each depleting compartment and with an inlet of each concentrating compartment. In some embodiments, at least a portion of the flow distribution system may be integral to the frame. In other embodiments, at least a portion of the flow distribution system may engage with the frame. One or more features of the manifold and/or flow distribution system may be integrated into the frame such as via an insert structure. In some embodiments, a flow distribution system may engage with each inlet and outlet of the cell stack.

Various designs for flow distribution systems capable of having the intended functionality may be implemented in accordance with one or more embodiments. Based on the nature of the cell stack, compartment inlets and outlets may be positioned on one or more sides of the cell stack. In some embodiments, compartment inlets and outlets may be positioned on all sides of the cell stack. The design of the frame, including manifold system and flow distribution systems, may be configured such that it may receive the cell stack in any orientation. Inserts or flow distribution systems may also be inserted or integrated into any manifold and be associated with any side of the cell stack for flexibility. A flow distribution system may be inserted or integrated and may serve to both provide fluid to be treated to the multiple compartment of the stack, and fluidly isolate and keep separate outlet streams of the cell stack.

In some embodiments, such as those involving turbulent fluid input, the potential for uneven fluid distribution within an electrochemical separation system may be addressed by a flow distribution system. Typically, turbulent flow may enter an inlet manifold or plenum at a high velocity, and the momentum of the flow may cause a large volume to favor the bottom plane of the manifold and cell stack. Accordingly, a disproportionate volume of fluid may be directed to the bottom plane of one or more cell stacks, as compared to the center and top planes.

In one or more embodiments, a flow distribution system may be constructed to promote uniform fluid flow through a cell stack and/or through individual compartments thereof. The flow velocity at any point in a fluid passageway or compartment of a cell stack may depend upon, for example, manifold dimensions and aspect ratios. In various embodiments, the flow velocity at any point in a fluid passageway or compartment of a cell stack may vary less than about +/−20%. In some embodiments, the velocity may vary less than about +/−10%. In some embodiments, a uniform flow velocity may refer to the velocity of flow within all three planes of the cell stack being substantially the same. For example, the flow velocity within all three planes may be substantially the same at a midplane of the cell stack. In some embodiments, the flow velocity within all three planes may be substantially the same at an inlet of the cell stack. A uniform flow velocity may minimize or eliminate stagnant zones, thereby increasing the efficiency of the system. A uniform flow velocity may also reduce the potential for scale formation, for example, the precipitation of $CaCO_3$, in the concentrating compartments. Raising the minimum flow velocity eliminated stagnation zones and reduces the likelihood that scaling will occur. In some embodiments, a flow distribution system may be constructed to promote uniform fluid flow across all planes of the cell stack. In at least certain embodiments, a flow distribution system may be constructed and arranged to direct incoming turbulent flow as transition flow into a cell stack. Turbulent flow is a flow characterized by chaotic property changes, including low momentum diffusion, high momentum convection, and rapid variation of pressure and flow velocity in space and time. Turbulent flow is characterized by a Reynolds number greater than 4,000. Transition flow is a fluid in the process of transitioning from turbulent to laminar flow or from laminar to turbulent flow. Transition flow is characterized by a Reynolds number between about 2,300 and about 4,000.

In some embodiments, a flow distribution system may be constructed and arranged to redirect incoming turbulent flow as laminar flow into inside a cell stack. Laminar flow occurs when a fluid flows in parallel layers, with no disruption between the layers. At low velocities, the laminar fluid tends to flow without lateral mixing. There are no cross-currents perpendicular to the direction of flow, nor eddies or swirls of fluids. In addition, in laminar flow, the motion of particles of the fluid is very orderly with all particles moving in well-defined streamlines lines. Laminar flow is characterized by a Reynolds number of less than about 2,300. Properties of the inlet flow may vary depending on the intended application and nature of the fluid. In some embodiments, the flow distribution system may be configured to accept an inlet flow rate sufficient to promote recirculation within the manifold. For example, the flow distribution system may be configured to accept an inlet flow rate of between about 1 cm/s and about 100 cm/s gpm from a source. In some embodiments, the inlet flow rate may be about 1 cm/s to about 100 cm/s gpm. Below about 1 cm/s, the flow distribution system may not redirect the flow effectively, and may not uniformly distribute the flow to the cell stack.

In some embodiments, a flow distribution system may be at least partially within an inlet manifold or an outlet manifold of an electrochemical separation apparatus. The flow distribution system may be in the frame of a modular unit. The flow distribution system may be in a plenum of the manifolding. In some embodiments, a flow distribution system may include a plurality of at least partially radially spaced baffles to promote uniform fluid flow across a width (i.e., x-axis) of a cell stack. In some embodiments, the baffles may be obstructions, projections, protrusions, flanges, ribs, or teeth. In accordance with one or more embodiments, the flow distribution systems are fabricated from materials with the requisite mechanical properties and chemical compatibility with the fluid to be deionized by electrochemical separation. In applications such as desalination of municipal, well, brackish or seawater, plastic materials are favored because of their resistance to corrosion and low cost. Potential plastics include polyvinyl chloride (PVC), polyethylene (PE), polypropylene (PP), polyamides (PA or nylon), acrylonitrile butadiene styrene (ABS), polysulfone or blends of plastics such as Noryl, which is a blend of polyphenylene oxide (PPO) and polystyrene (PS). Reinforcing fillers such as glass fibers may be added for enhancement of chemical resistance and mechanical and thermal properties.

The baffles may be sized to substantially completely span the length of an axis of the manifold. For example, the baffles may substantially completely span the length of the z-axis of the manifold. The baffles may define passages through which fluid flows, and may be spaced to evenly divide fluid flow. In some embodiments, the baffles may be spaced evenly from each other. In some embodiments, the baffles may be spaced from each other at an angle. In some embodiments, the baffles may be spaced at least partially radially from each other. The baffles may be spaced about 3 mm to about 4 mm from each other. The number and spacing of the baffles may vary depending on factors including the dimension and geometry of the cell stack and design of the module and/or manifold.

In some embodiments, a flow distribution system may include a plurality of ramps, or fluid lifts, to promote uniform fluid flow to a top plane, a center plane, and a bottom plane of the cell stack. The ramps may be configured and positioned in a separate plane from the baffles. As discussed above, typically, turbulent flow enters an inlet manifold at a high velocity, and the momentum of the flow causes a large volume to favor the bottom plane of the manifold. Accordingly, a disproportionate volume of fluid may be directed to the bottom plane of the electrochemical separation system, as compared to the center and top planes. Ramps positioned on a bottom face of the manifold are configured to redirect the momentum of the incoming fluid flow away from the bottom plane and up the front face of the cell stack. The ramps on the bottom face of the manifold therefore redirect the inlet fluid from the bottom plane of the cell stack to the top and center planes.

In some embodiments, the ramps may be spaced in an array such that they define grooves. The grooves on the bottom face of the manifold may provide channels through which the fluid may flow to the bottom plane. As the ramps on the bottom face of the manifold redirect flow to the top and center planes, the grooves allow fluid to flow to the bottom plane. In this way, the grooves may normalize flow velocity to all three flow planes. The grooves may also simplify the design for injection molding by converting the ramp from a continuous raised feature to distinct bosses.

As discussed above, in some embodiments, the ramps may be positioned on the bottom face of the manifold. In some embodiments, the ramps may be positioned on the top face of the manifold. The ramps may be on both the top and the bottom face of the manifold. Ramps on the bottom face of the manifold may have any geometry which directs the fluid to the center line of the cell stack. For example, the ramps may be designed such that the tangent of the top of the ramp is directed to the center line of the cell stack. In some embodiments, the ramps may have a parabolic geometry. In some embodiments, the ramps may have an increasing taper height. The taper may be defined through any number of functions, such as, but not limited to, a polynomial function, a trigonometric function, an exponential function, or other such mathematical equation. These functions may be scaled appropriately to the aspect ratio of the inlet manifold. In some embodiments, a plurality of ramps may have multiple profiles. In some embodiments, a plurality of ramps may have varying heights.

The geometry and dimensions of the ramps may vary, and may be dependent on, for example, the size of the cell stack, the number of cell pairs, the spacing within the cell stack, and feed flow rates. Ramps on the top face of the manifold may have any geometry which directs fluid flow to recirculate through the manifold. Ramps on the top face of the manifold may have the same or different geometry from ramps on the bottom face. For example, ramps on the top face of the manifold may have the same or different radii of curvature. In some embodiments, the ramps on the top face of the manifold may be in the shape of an arc of a circle. In some embodiments, the arc may be of a circle having a diameter of 25-30 mm. As with the baffles, the number, spacing, and geometry of the ramps may depend on the nature of the cell stack and module and/or manifold design.

In accordance with one or more embodiments, the flow into the cell stack may be adjusted, redistributed, or redirected to provide more even contact of the fluid with the membrane surfaces within the compartments of the cell stack. Each of the compartments in the cell stack for an electrical purification apparatus may be constructed and arranged to provide a predetermined percentage of surface area or membrane utilization for fluid contact. It has been found that greater membrane utilization provides greater efficiencies in the operation of the electrical purification apparatus.

In accordance with one or more embodiments, the flow distribution system may be integral to the structure of a manifold or frame surrounding the cell stack. In other embodiments, at least a portion of the flow distribution systems may be configured to engage with the frame or manifold. The flow distribution system may comprise an insert removably receivable by the manifold. The modular unit can include one or more flow distribution systems. In some embodiments, a flow distribution system may be associated with one or more sides of the cell stack. In at least some embodiments, a flow distribution system may be associated with each side of the cell stack. Each side of the cell stack may have a dedicated flow distribution system. A flow distribution system may be configured to be removably received by the electrochemical separation device.

Figure 2:
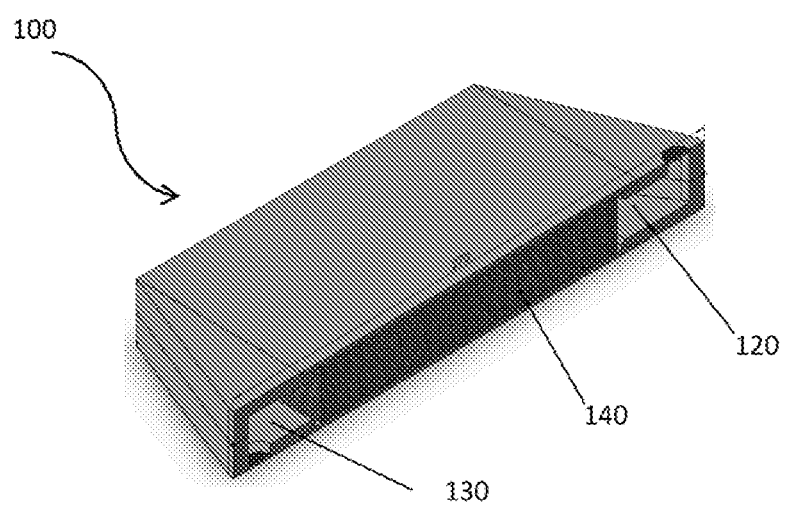
FIG. 2 is a cross-sectional illustration of the module of FIG. 1 taken along section line 2-2 in accordance with one or more embodiments.

As discussed, an electrochemical separation system may include an inlet manifold, as schematically illustrated in FIG. 1. Module 100 may include frame 110, inlet manifold 120 comprising inlet 121, and outlet manifold 130. FIG. 2 presents a cross-sectional view of module 100 taken at line 2-2 illustrating inlet manifold 120, outlet manifold 130, and cell stack 140. Multiple modules may be fluidly connected to provide a desired overall number of cell pairs or compartments between a pair of electrodes.

Figure 3:
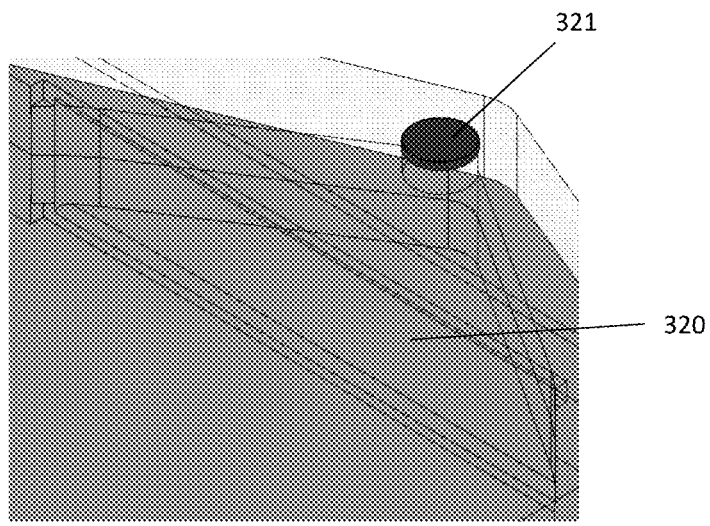
FIG. 3 is a schematic illustration of a manifold having no flow distribution system in accordance with one or more embodiments.
Figure 4:
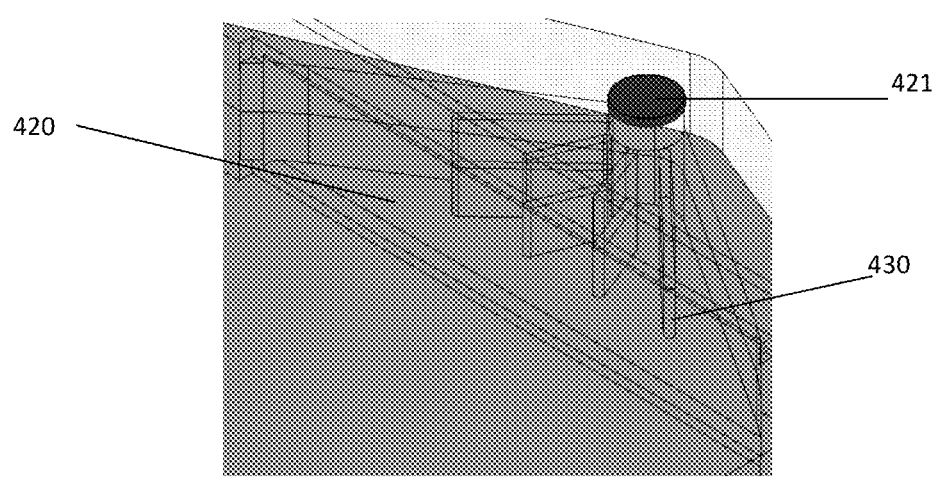
FIG. 4 is a schematic illustration of a manifold having a flow distribution system comprising ribs in accordance with one or more embodiments.
Figure 5:
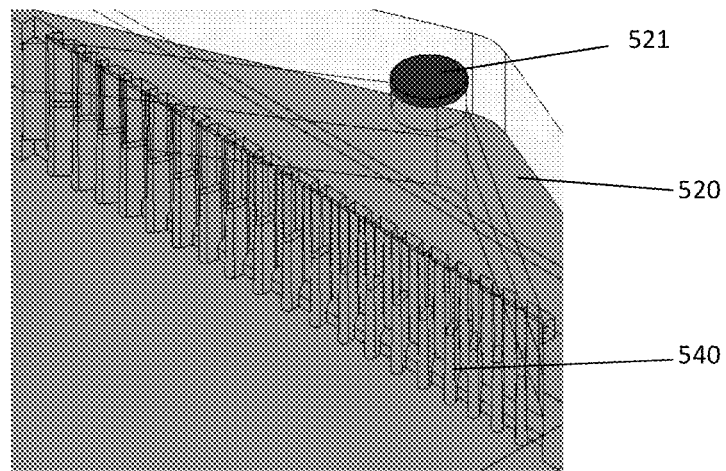
FIG. 5 is a schematic illustration of a manifold having a flow distribution system comprising teeth in accordance with one or more embodiments.
Figure 6A:
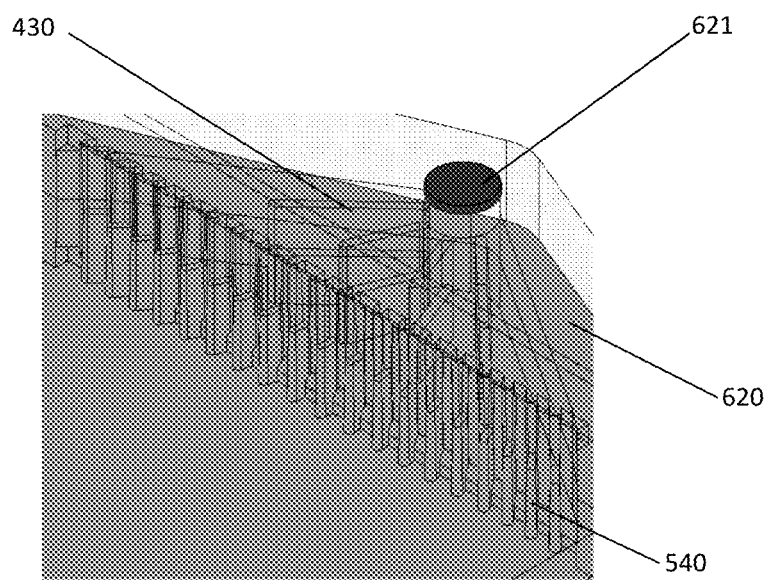
FIGS. 6A, 6B, and 6C are schematic illustrations of a manifold having a flow distribution system comprising ribs and teeth in accordance with one or more embodiments.
Figure 6B:
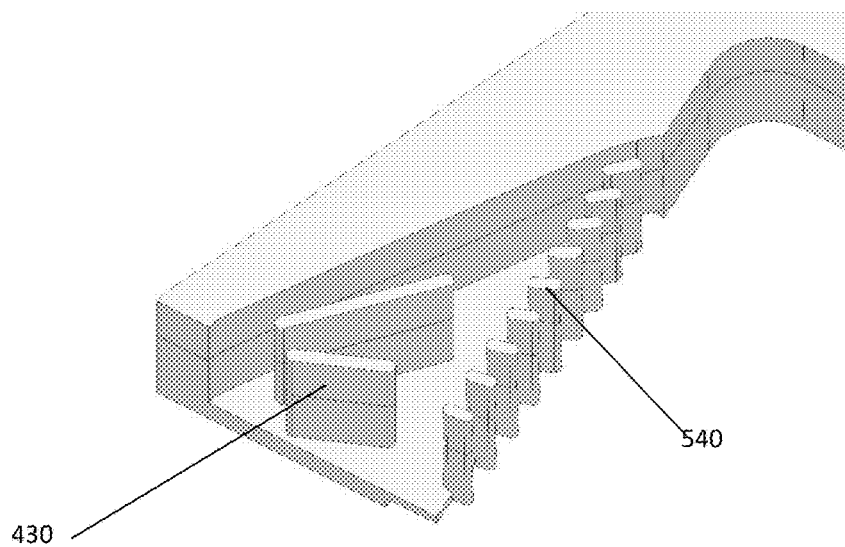
Figure 6C:
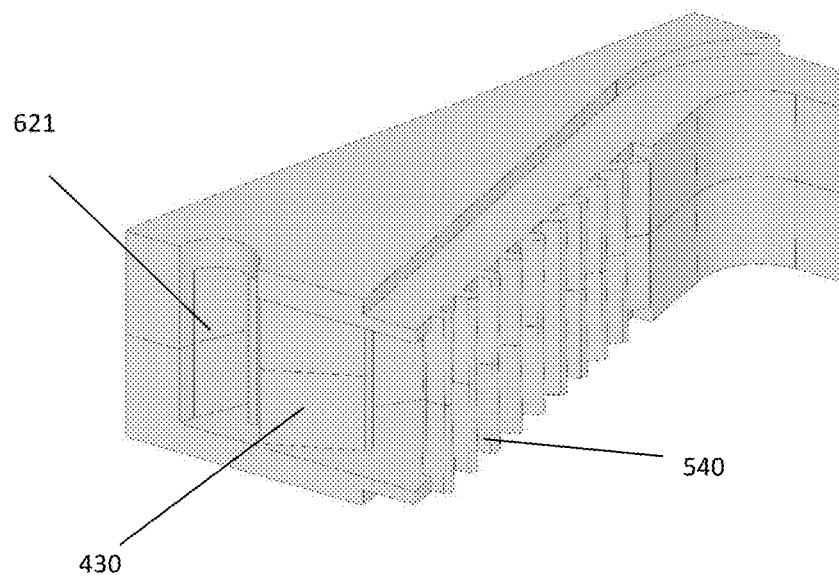

In some embodiments, the inlet and/or outlet manifold may comprise fluid flow distribution system. FIG. 3 depicts a manifold 320 including an inlet 321, but having no fluid flow distribution system. A fluid flow distribution system can be in various configurations, as shown in non-limiting FIGS. 4-9. FIG. 4 depicts a manifold 420 comprising an inlet 421, and ribs 430. FIGS. 5A, 5B, and 5C illustrate a manifold 520 comprising inlet 521, and teeth 540. FIGS. 6A, 6B, and 6C show a manifold 620 comprising an inlet 621, and a combination of ribs 430 and teeth 540.

Figure 7A:
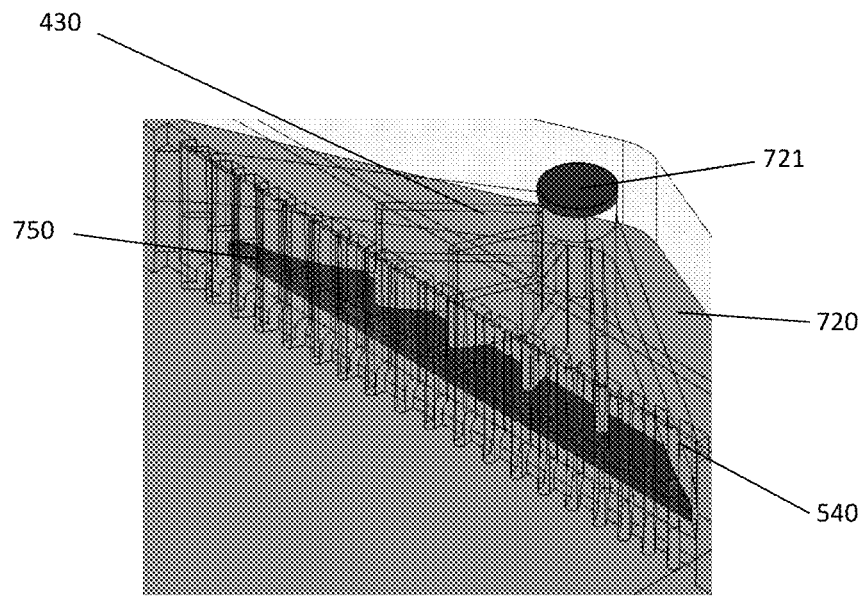
FIG. 7A is a schematic illustration of a manifold having a flow distribution system comprising ribs, teeth, and ramps on the bottom face of the manifold in accordance with one or more embodiments.
Figure 7B:
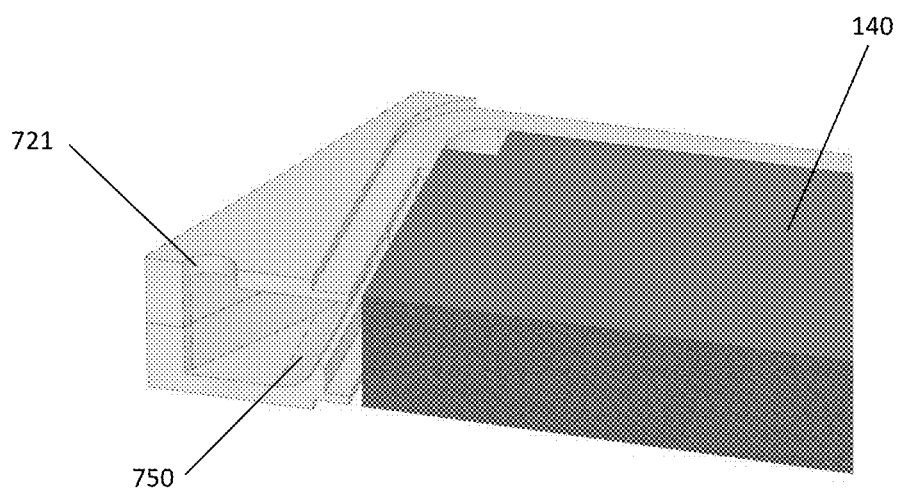
FIG. 7B is a schematic illustration of a manifold having a flow distribution system comprising ramps on the bottom face of the manifold in accordance with one or more embodiments.
Figure 8A:
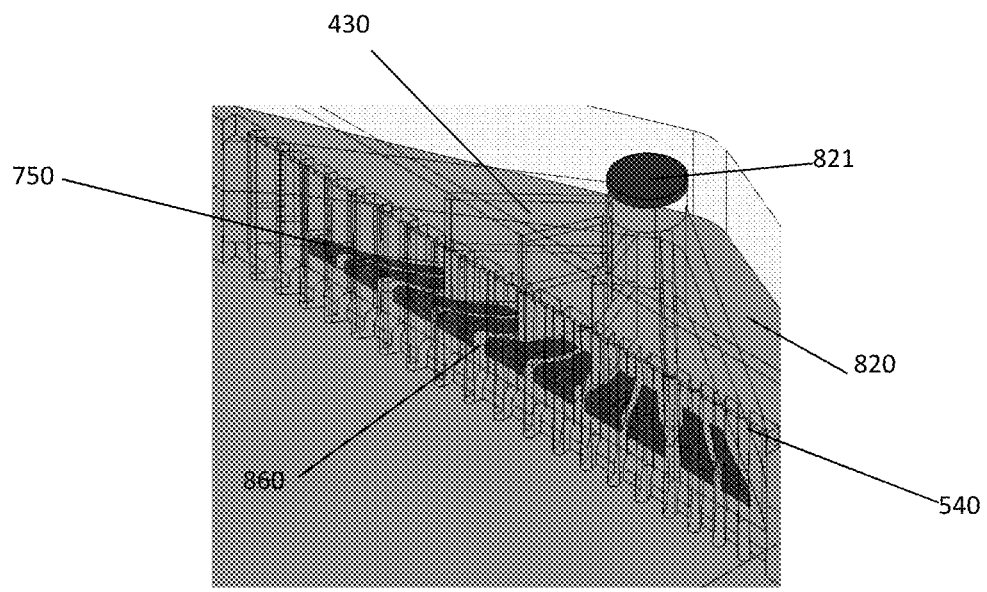
FIG. 8A is a schematic illustration of a manifold having a flow distribution system comprising ribs, teeth, ramps, and grooves on the bottom face of the manifold in accordance with one or more embodiments.
Figure 8B:
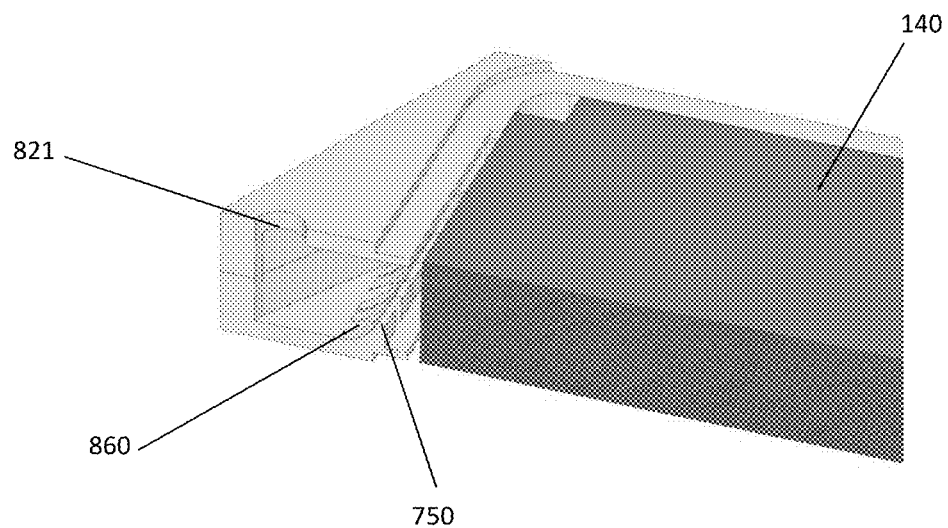
FIG. 8B is a schematic illustration of a manifold having a flow distribution system comprising ramps and grooves on the bottom face of the manifold in accordance with one or more embodiments.
Figure 9A:
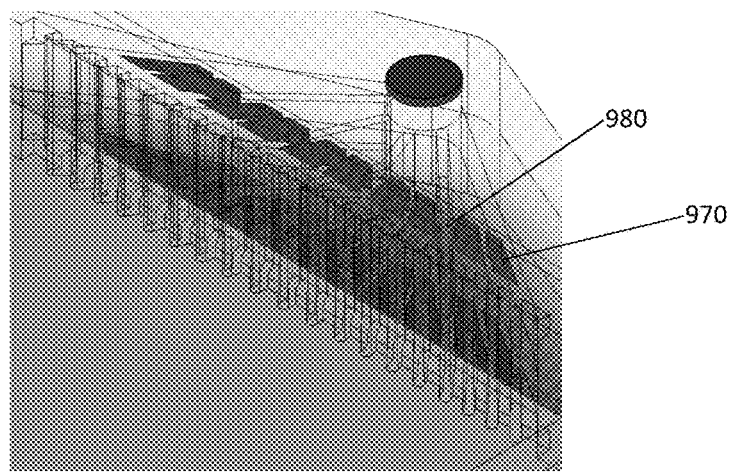
FIG. 9A is a schematic illustration of a manifold having a flow distribution system comprising ribs, teeth, and ramps on the bottom and top faces of the manifold in accordance with one or more embodiments.
Figure 9B:
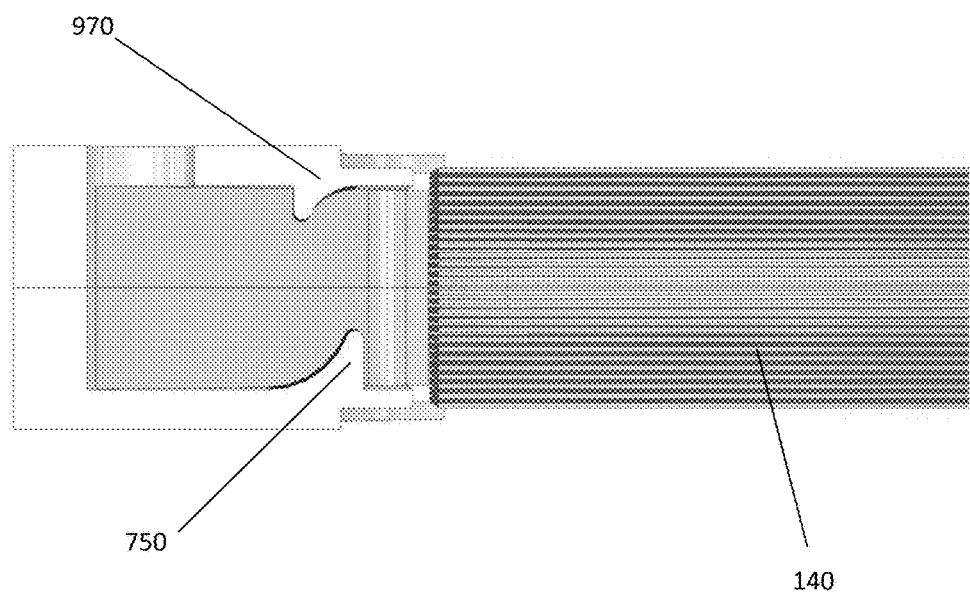
FIG. 9B is a schematic illustration of a manifold having a flow distribution system comprising ramps on the bottom and top faces of the manifold in accordance with one or more embodiments.

Referring to FIG. 7A, a manifold 720 comprises inlet 721, ribs 430, teeth 540, and fluid lifts 750 on the bottom face of the manifold. FIG. 7B shows a side view of ramp 750 in the flow distribution system. FIGS. 8A and 8B introduce grooves 860 to the fluid lifts 750 on the bottom face of the manifold. And FIG. 9A introduces fluid lifts 970 and grooves 980 to the top face of the manifold. FIG. 9B shows fluid lifts 750 and 970 on the bottom and top faces of the manifold, respectively.

In some embodiments, flow distribution systems may be fabricated by machining solid plastic materials, for example, or by rapid prototyping methods such as stereolithography (SLA). For high volume manufacturing at low cost, injection molding is a preferred method. In some embodiments, flow distribution system design may generally be conducive to injection molding. Select design parameters to facilitate manufacture include the length of the vertical flow passages relative to their width, and thickness of the material between flow passages. In some non-limiting embodiments, a tooth feature may have a height of about 30 mm, a length of about 5 mm, and a width of about 2 mm. In some non-limiting embodiments, a rib may have a height of about 30 mm, a length of about 27 mm, and a width of about 2 mm. In some non-limiting embodiments, a ramp may have a height of between about 4 mm and 7 mm, a length of between about 11 mm and about 21 mm, and a width of about 3 mm to about 7 mm. In some non-limiting embodiments, a groove may have a width of about 1 mm to about 5 mm. In some embodiments, flow distribution systems may be manufactured at relative low cost with high dimensional precision.

In some embodiments, a thickness of the baffles that define the passages are as uniformly thin as possible to reduce the total mass of the flow distribution systems and ensure uniform but rapid cooling throughout after the molten plastic is injected into the mold cavity. In injection molding terminology, this design step is referred to as "coring out" the part to reduce material cost and cycle time. The "coring" step must not result in internal void spaces that can be filled with stagnant fluid, which can lead to biogrowth.

In accordance with one or more embodiments, a flow distribution system may be formed from separate molded parts configured to be assembled together. Depending on the method of manufacture, internal void volumes may need to be sealed. Internal spaces not in the flow paths must be sealed to prevent leakage of fluid into the spaces and accumulation of stagnant fluid. In some preferred embodiments, there is generally flow through all internal spaces.

Possible methods of joining the parts include adhesive bonding and ultrasonic welding. In some preferred embodiments, parts may be configured to mate together without need for bonding or welding, such as by snapping or tightly fitting together. In some embodiments, a labyrinth flow pattern may be formed by the interaction or mating of adjacent parts upon assembly. The slots in each part have length to width ratio small enough that blades necessary in the mold to form the slots can be mechanically strong enough to withstand the stresses during the molding process.

In accordance with one or more embodiments, the flow distribution system may have a first side configured to be disposed proximate a cell stack of the electrochemical separation device, wherein the flow distribution system comprises a plurality of ports on the first side, and may further have a second side arranged opposite the first side, wherein the flow distribution system comprises a plurality of ports on the second side. The ports on the first side may be fluidly connected to inlets and/or outlets of the cell stack. The ports on the second side may be fluidly connected to an outlet of a source of water to be treated or to an inlet of a point of use or downstream unit operation.

In accordance with one or more embodiments, the flow distribution systems are fabricated from materials with the requisite mechanical properties and chemical compatibility with the fluid to be deionized by electrochemical separation. In applications such as desalination of municipal, well, brackish, or seawater, plastic materials are favored because of their resistance to corrosion and low cost. Potential plastics include polyvinyl chloride (PVC), polyethylene (PE), polypropylene (PP), polyamides (PA or nylon), acrylonitrile butadiene styrene (ABS), polysulfone or blends of plastics such as Noryl, which is a blend of polyphenylene oxide (PPO) and polystyrene (PS). Reinforcing fillers such as glass fibers may be added for enhancement of chemical resistance and mechanical and thermal properties.

In accordance with one or more embodiments, a frame may tightly support sides of a stack of cell pairs to maintain alignment. Ports may connect inlet and outlet manifolds to the flow compartments. This may promote uniform flow distribution across a width of flow compartments and reduce current leakage from compartments to manifolds. Membrane at the ends of a stack may be secured and sealed to the frame with o-rings, potting or other mechanism. Membranes may also be secured through a weld or a series of welds, for example, seals generated through thermoplastic adhesion. A frame may be assembled from multiple sections or may be integral, such as molded as one part. Modular units next to end blocks may be separated from electrode compartments by membranes and may also be sealed, such as with o-ring or adhesive. A modular unit frame, or the manifold system of a modular unit frame, may generally include one or more dilute ports and one or more concentrate ports. The ports may be embedded in the frame or on a flow distribution system insert. The modular unit frame may include manifolding and a flow distribution system that may include one or more inserts or flow distribution systems removably receivable by the frame. The modular unit manifold may be fluidly connected to larger overall system manifolding. The manifold may include one or more recesses sized and shaped to at least partially receive a flow distribution system insert.

In accordance with one or more specific non-limiting embodiments, a stack of cell pairs may be enclosed on four sides in a frame of unitary construction to form modular unit. A set of manifolds in the frame section supplies the feed to the inlet of the dilute compartments via an array of passages and channels. At the outlet of the dilute compartments, product water flows through a second array of passages and channels and enters a second set of manifolds. Another section would include the same arrangement of manifolds comprising passages and channels for the concentrate compartments. The inlet and outlet to the dilute and concentrate compartments may be isolated from each other by seals between the corners of the stack and the frame. The seals can be achieved by various techniques such as adhesives, thermal bonds or combinations thereof.

The passages and channels that connect the inlet and outlet manifolds to the flow compartments, when properly designed, can ensure that flow is uniformly distributed across the inlet of each dilute compartment. There is no need to line up the passages and channels with the inlets of individual compartments.

In some embodiments, systems and methods may support a stack of cell pairs on all sides by a frame. The frame can be as deep as necessary to accommodate the number of cell pairs in a stack. The frame may have ports which connect the inlet and outlet manifolds for the dilute and concentrate streams to their respective flow compartments in the stack. Among the expected benefits of such a design is reduction of current bypass by elimination of the open areas at the inlets and outlets to the stack. A stack of cell pairs can be potted at the corners in a frame to form a modular sub-block that can be checked for cross-leaks, desalination performance and pressure drop. Multiple blocks can be stacked to form a modular unit. Blocking membranes can be inserted between the blocks to direct the dilute and/or concentrate stream into multiple-pass flow configurations. The manifolds may have recesses to receive inserts and ports for manifolding. The inserts may be installed before the stack is potted to the manifold.

In some non-limiting embodiments, stacks of cell pairs with dilute and concentrate compartments in single-pass flow configurations may be sealed in sections to form modular units. The units may be joined together with blocking spacers in between to form multiple pass configurations. The stacks may be sealed to the housing section using adhesive at corners. The blocking spacers do not have to be sealed to the inside wall of the housing but are instead sandwiched between modular units and sealed between the ends. In some non-limiting embodiments, two modular units with flanges at ends may be stacked with a blocking spacer in between. The flanges may be bolted together. The blocking spacer may be molded with a frame and sealed between the flanges with adhesives or gaskets. Alternatively, the frame may be molded of a thermoplastic material or other fabrication method. In some embodiments, modular units may be connected with clamps or tie bars. The design of the blocking spacer may be modified accordingly.

The function and advantages of these and other embodiments will be more fully understood from the following examples. The examples are intended to be illustrative in nature and are not to be considered as limiting the scope of the embodiments discussed herein.

EXAMPLES

Example 1

Impact of Flow Distribution System Geometry at Cell Stack Midplane

To explore the impact of changes in geometry, fluid was fed to a cell stack from an inlet manifold comprising various flow distribution system configurations. As a result, multiple representative velocity plots were prepared. Velocity streamlines, taken vertically through the center plane of the cell stack, were used to compare turbulence. Bulk velocities were depicted in corresponding multi-planar heat maps. These plots correlate two-dimensional elevation to velocity.

Figure 10:
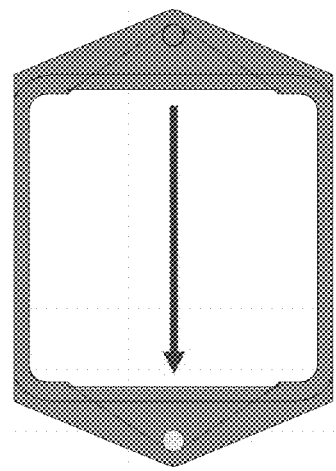
FIG. 10 is a schematic illustration of the direction of flow through a cell stack in accordance with one or more embodiments.
Figure 11:
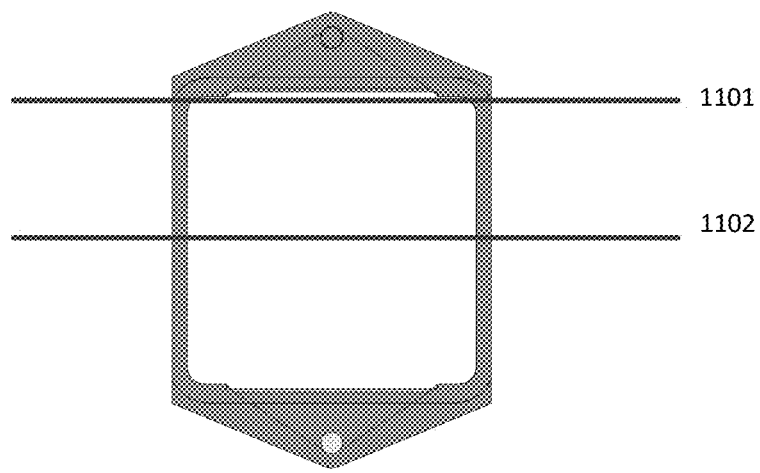
FIG. 11 is a schematic illustration of inlet and midplane linecuts of a cell stack in accordance with one or more embodiments.
Figure 12:
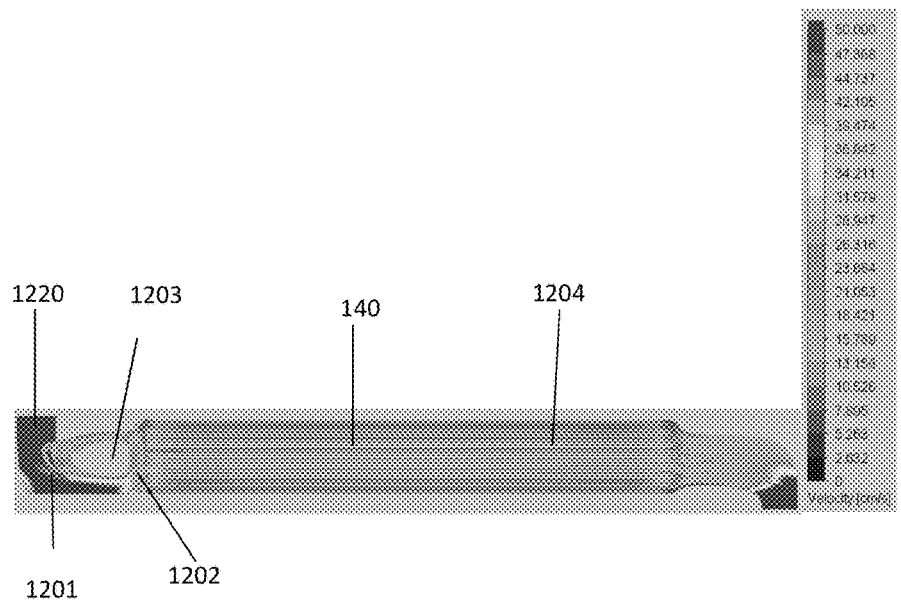
FIG. 12 is a velocity streamline map in accordance with one or more embodiments.

Velocity streamlines and bulk velocities were first determined for the base geometry of an inlet manifold without a fluid flow distribution system. FIG. 10 depicts the direction of flow along the y-axis of the cell stack associated with the manifold having a base geometry. Velocities were measured at the inlet velocity linecut 1101 and the extrapolated midplane velocity linecut 1102 (FIG. 11). A fluid was fed to the inlet manifold 1220 at a flow rate of 100 cm/s. As the high velocity turbulent flow 1201 in the z-plane passed through the port into the inlet manifold, it experienced an abrupt change in direction in the y-plane at the bottom surface, and became transition flow 1202. This initiated a stationary vortex 1203 before transitioning to laminar flow 1204 in the membrane stack, as illustrated by FIG. 12. The fluid was not effectively recirculated within the manifold, and was not uniformly distributed to the components of the cell stack.

Figure 13:
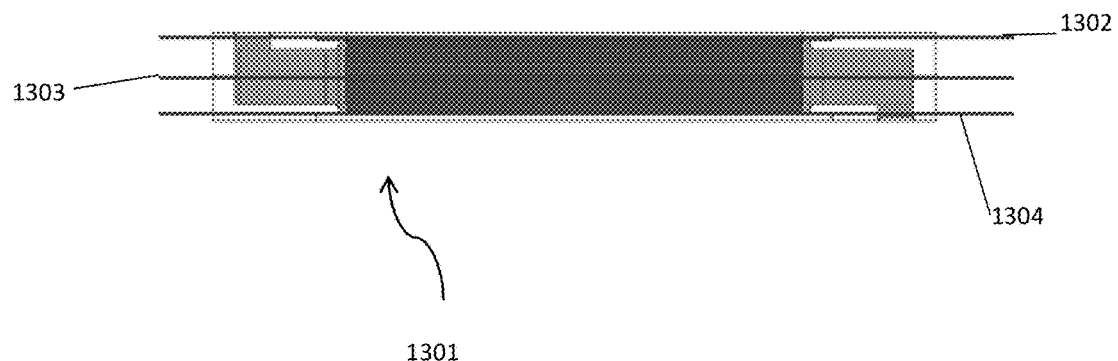
FIG. 13 is a schematic illustration of top, center, and bottom planes of a cell stack in accordance with one or more embodiments.

Fluid velocity in the cell stack 1301 was measured at the extrapolated midplane linecut 1102 in three separate planes: the top plane (1302), the center plane (1303), and the bottom plane (1304), as illustrated in FIG. 13.

Figure 14:
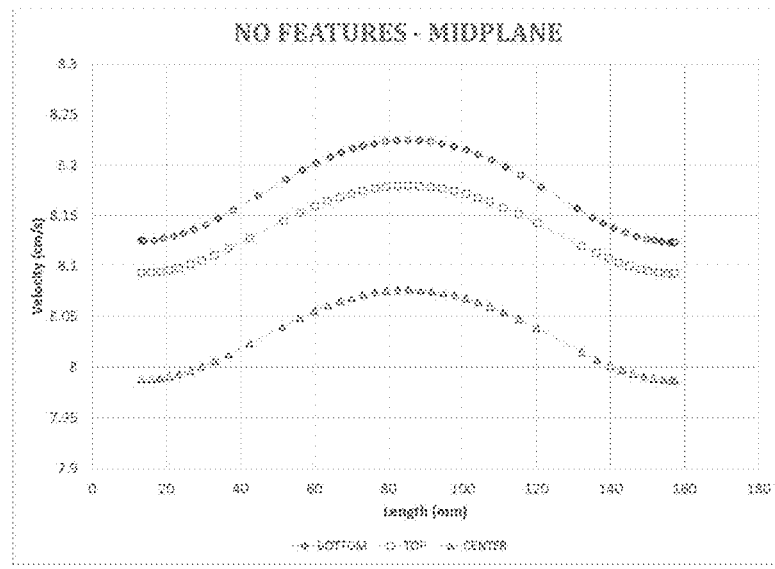
FIG. 14 is a bulk velocity plot in accordance with one or more embodiments.
Figure 15:
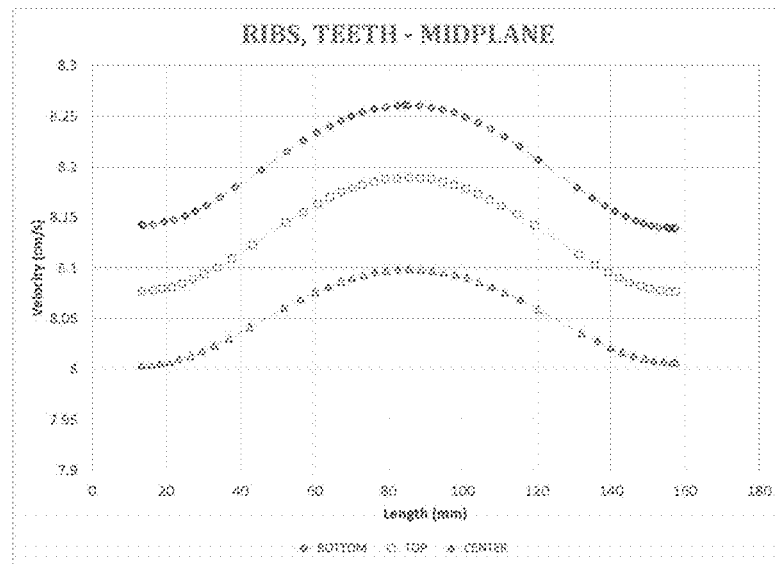
FIG. 15 is a bulk velocity plot in accordance with one or more embodiments.

FIGS. 14-18 represent extrapolated midplane 1102 velocity profiles associated with specific flow distribution system structures. Referring to FIG. 14, a velocity profile shows an uneven velocity distribution across the top, center, and bottom planes in a device having a manifold with no flow distribution system. Variations in flow distribution at the cell stack face resulted in uneven x-axis and z-axis velocity profiles. The bottom flow was greater than the velocity of flow in the top plane, which was greater than the velocity of flow in the center plane.

To address the non-uniform flow distribution along the x-axis, several variations of flow redirection systems were incorporated, specifically ribs 430 only (FIG. 3), teeth 540 only (FIG. 5), and ribs 430 with teeth 540 (FIG. 6). Adding ribs 430 only did little to redistribute flow along the x-axis. Adding teeth 540 only to the flow distribution system had a significant effect compared to adding ribs 430 only. Combining the two types of baffles, ribs 430 and teeth 540, in a fluid flow distribution system of the manifold resulted in a more uniform flow distribution along the x-axis, along with tighter stationary vortices along the membrane face, but the velocity in the bottom plane was still greater than the velocity in the top plane, which was still greater than the velocity in the center plane. Neither baffle type had a significant impact on the elevated velocity in the bottom cross-sectional plane, as compared to the center and top plane.

Figure 16:
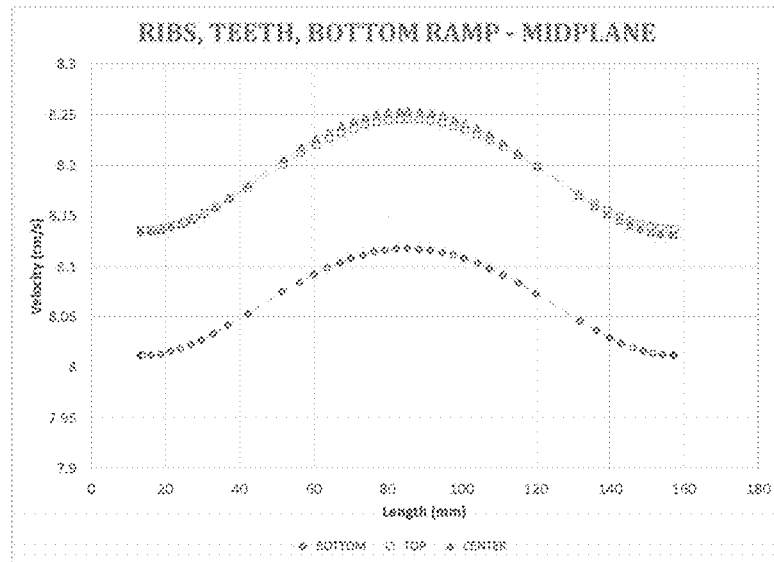
FIG. 16 is a bulk velocity plot in accordance with one or more embodiments.

Since significantly higher velocity was still observed in the bottom plane relative to the center and top planes, a need for vertical flow redirection was indicated. A ramp feature 750 was incorporated on the bottom face opposing the manifold inlet port, as shown in FIG. 7. The ramp 750 raised the injection point of the highest velocity streamlines, and increased velocity through the center and top planes, while lowering stack velocity in the bottom plane (FIG. 16). It is thought that the ramps redirect flow from the bottom plane of the cell stack to the top plane of the cell stack, leading to deficient flow to the bottom plane.

Figure 17:
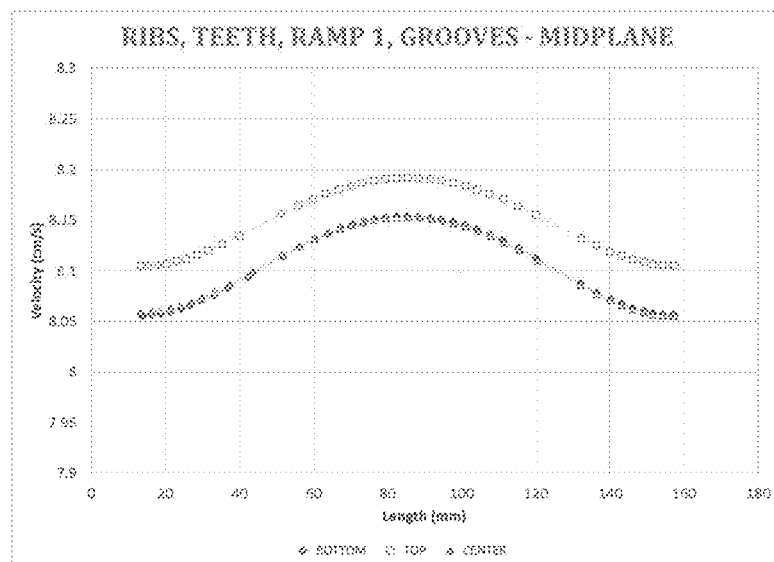
FIG. 17 is a bulk velocity plot in accordance with one or more embodiments.

To promote normalized velocity across all three planes, grooves 860 were incorporated into the bottom ramp 750 (Ramp 1) to allow the passage of flow. As shown in FIG. 17, the velocity in the top plane was higher than the velocity in the bottom and center plane, which were about equal. It is thought that the grooves allow for fluid to flow through the bottom plane face, without being redirected by the ramps. Still, flow in the top plane was higher than flow in the bottom and center planes.

Figure 18:
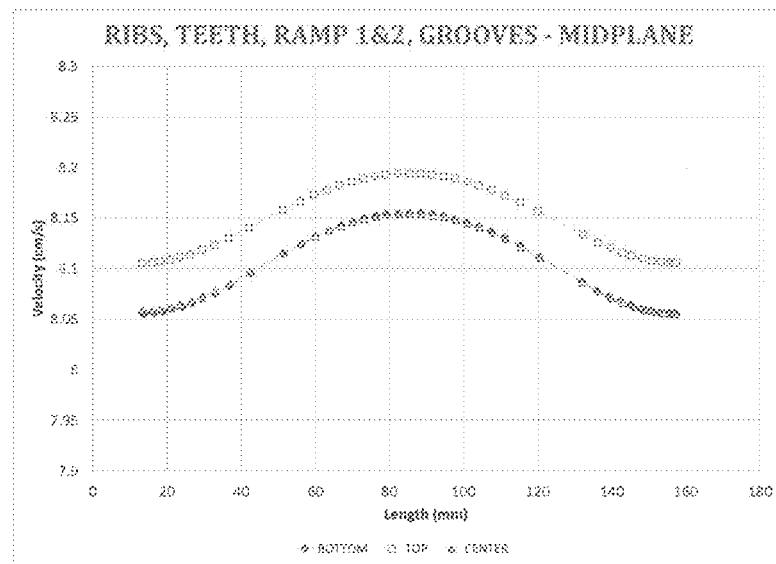
FIG. 18 is a bulk velocity plot in accordance with one or more embodiments.

To address this, complementary ramps 970 (Ramp 2) and grooves 980 were then incorporated to the top manifold face, as depicted in FIG. 18. In this embodiment, tighter recirculation of the stationary vortex within the manifold was observed, along with improvements in velocity distribution in both the x- and z-axes.

Figure 19:
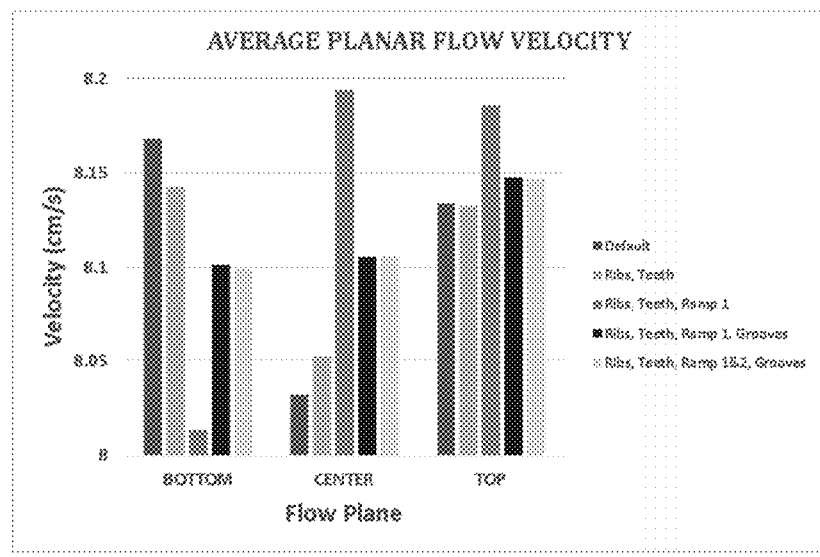
FIG. 19 is an average planar velocity chart in accordance with one or more embodiments.

FIG. 19 is a chart of the average planar flow velocity in each of the bottom, center, and top flow planes of the cell stack for each of the flow distribution system configurations, as assembled from the data plotted in FIGS. 14-18.

It was determined that the combination of ribs, teeth, and top and bottom fluid lifts with grooves was most effective in normalizing fluid flow distribution into and out of a cell stack of an electrochemical separation device.

Example 2

Impact of Flow Distribution System Geometry at Cell Stack Inlet

To further explore the impact of changes in geometry, velocities were also measured at the inlet velocity linecut 1101 of the cell stack, using the same experimental setup as Example 1.

Figure 20:
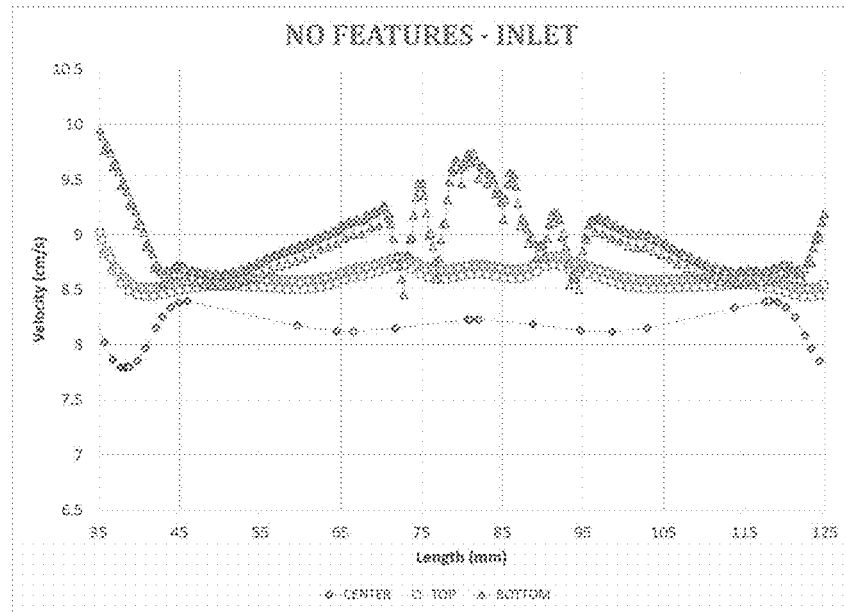
FIG. 20 is bulk velocity plot in accordance with one or more embodiments.
Figure 21:
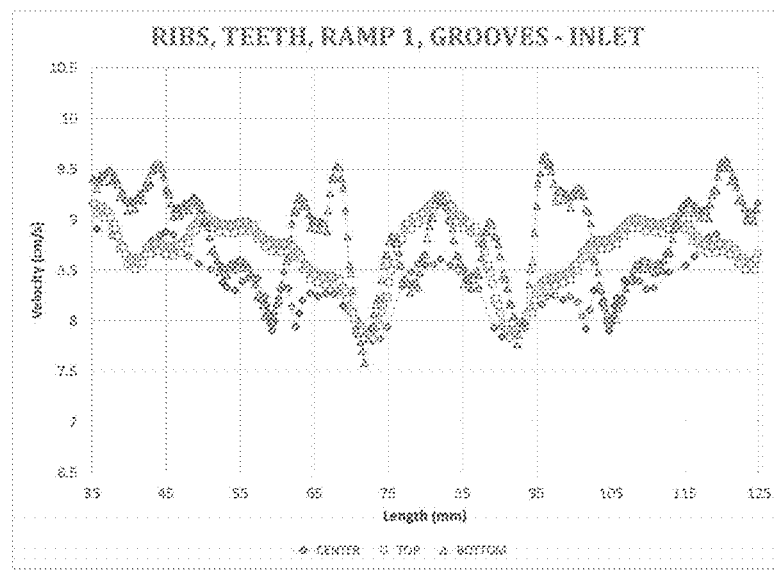
FIG. 21 is bulk velocity plot in accordance with one or more embodiments.
Figure 22:
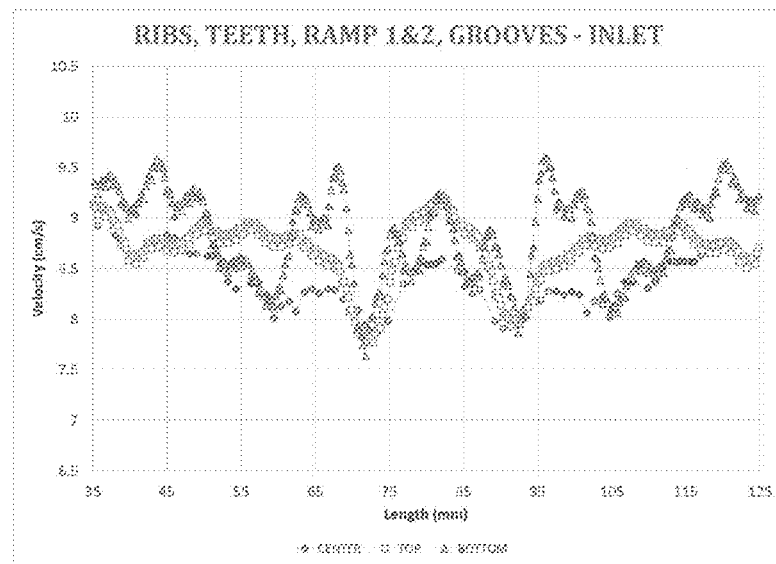
FIG. 22 is a bulk velocity plot in accordance with one or more embodiments.

First, fluid was fed to an inlet manifold having no flow distribution system. As shown in FIG. 20, the average flow in the top, center, and bottom planes are non-uniform. Referring to FIG. 21, fluid was fed to an inlet manifold comprising a flow distribution system having ribs, teeth, and a ramp (Ramp 1) and grooves on the bottom face of the system. The velocity of the fluid at the inlet of each plane of the cell stack varied greatly over a length of 125 mm FIGS. 21 and 22 are plots which contain lengths of 35-122 mm as the x-axis. These lengths refer to the inlet aperture of the stack, which is thinner than the full width of the stack at the midplane. The velocity profile along the inlet velocity linecut 1101 is used as a basis for comparison. Similar results are shown in FIG. 22, which is an inlet velocity plot of flow from a flow distribution system comprising ribs, teeth, and ramps (Ramps 1 and 2) and grooves on the top and bottom faces of the system.

Figure 23:
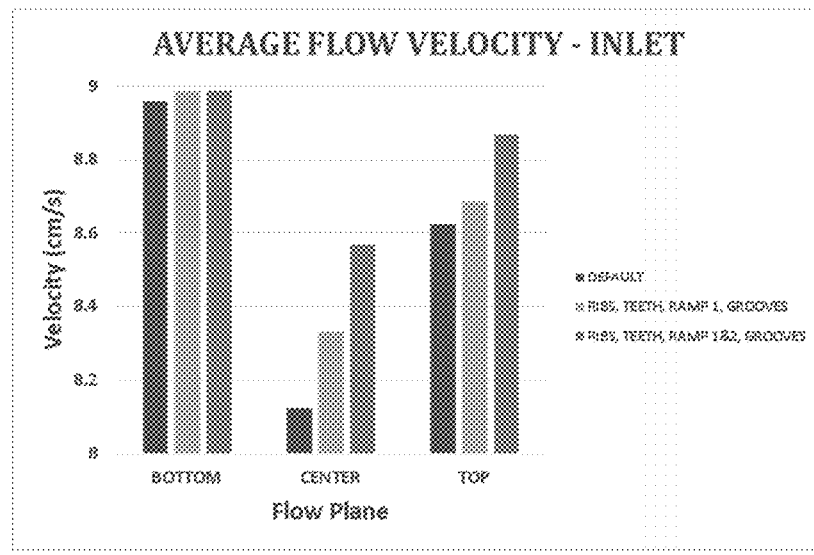
FIG. 23 is an average flow velocity chart in accordance with one or more embodiments.

The average flow at the bottom, center, and top planes was calculated for each configuration. The inlet flow rate at the bottom plane was higher than the inlet flow rate of the center and top planes for each configuration. The inlet flow rate at the top plane was higher than the inlet flow rate of the center plane for each configuration. The flow rate at all three planes was highest when the system consisted of ribs, teeth, and ramps and grooves on the top and bottom faces of the system. The flow rate at all three planes was lowest when the manifold did not include a flow distribution system (FIG. 23).

Example 3

Impact of Ramps and Grooves

To explore the impact of a ramp alone and of a ramp and grooves alone, fluid was fed to a cell stack from an inlet manifold consisting of these features. Fluid velocities were measured at the midplane linecut 1102 of the cell stack, using the same experimental setup as in Examples 1 and 2.

Figure 24:
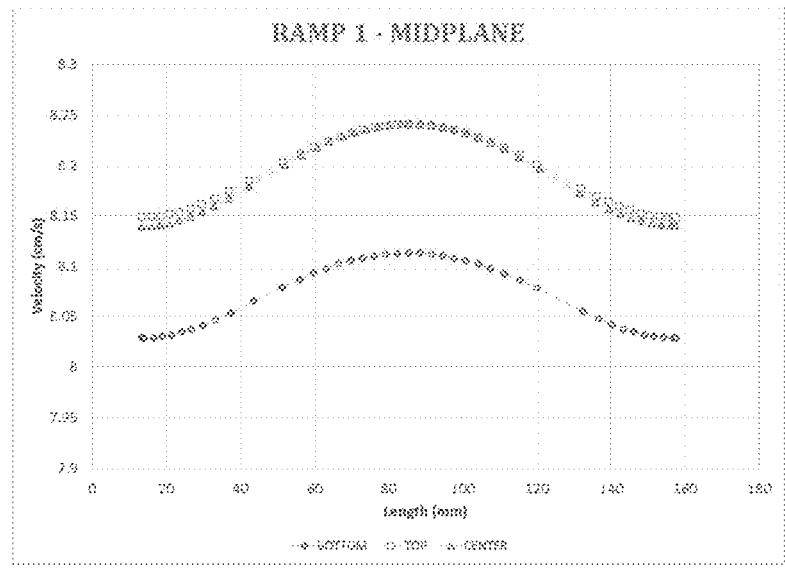
FIG. 24 is a bulk velocity plot in accordance with one or more embodiments.

First, fluid flowed from an inlet manifold consisting of one ramp (Ramp 1) spanning the length of the bottom face of the manifold. As shown in FIG. 24, the fluid velocities in the top plane and the center plane of the cell stack were approximately equal and were higher than the velocity in the bottom plane of the cell stack.

Figure 25:
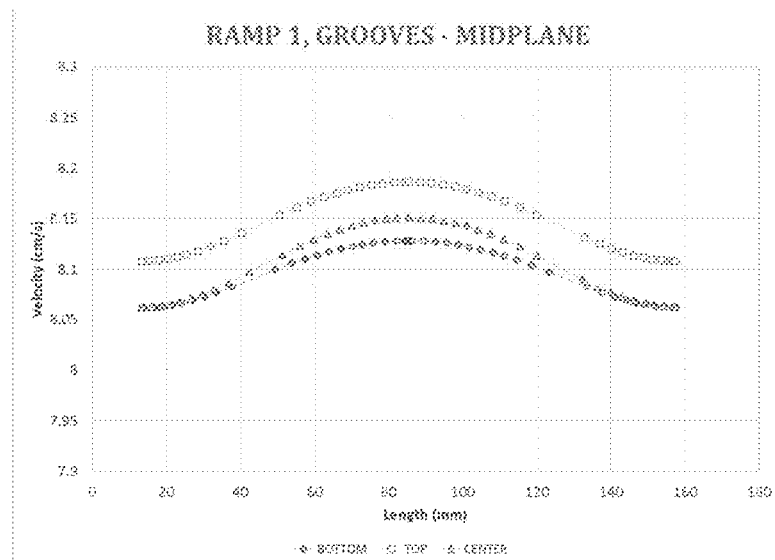
FIG. 25 is a bulk velocity plot in accordance with one or more embodiments.

Next, fluid flowed from an inlet manifold consisting of ramps (Ramp 1) spaced to define grooves on the bottom face of the manifold. As shown in FIG. 25, the velocity in the bottom plane was higher than when only a single ramp was used, and was close to the velocity in the center plane, which decreased from when a single ramp was used. The velocity in the top plane was higher than the velocity in the bottom and center planes, and also decreased from when a single ramp was used.

The ramps were determined to be effective at redirecting fluid flow from the bottom plane to the top and center planes, and the grooves were found to be effective at providing channels for fluid to flow to the bottom plane.

Example 4

Impact of Input Flow Rate

To explore the impact of changes in incoming flow rate on the effectiveness of the flow distribution system, fluid was fed to a cell stack from an inlet manifold having various incoming flow rates. As a result, multiple representative velocity plots were prepared. Velocity streamlines, taken vertically through the center plane of the cell stack, were used to compare turbulence. In all instances, the flow distribution system comprised ribs, teeth, ramps, and grooves.

Turbulent water was fed to an inlet manifold comprising the flow distribution system at a flow rate of about 100 cm/s and was distributed through the cell stack at about 8 cm/s. The feed water was recirculated within the flow distribution system, and was evenly distributed to the cell stack.

As feed flow to the manifold approached transition flow, the effect of the flow distribution system was observed to decrease. With a feed flow rate of about 10 cm/s and a velocity of about 0.8 cm/s through the cell stack, recirculation of the flow within the manifold is decreased as compared to the turbulent feed flow, and the velocity through the cell stack is reduced. At a further reduced feed flow rate of about 1 cm/s, the velocity through the stack was about 0.08 cm/s, indicating an even greater decrease in effectiveness.

Finally, when the feed flow is laminar, the flow distribution system was observed to be not effective. Fluid having a feed flow rate of 0.1 cm/s did not undergo recirculation within the manifold, and passed through the cell stack at a flow rate of about 0.008 cm/s.

The data indicate that the flow distribution system has a great effect on the distribution of turbulent flow having a Reynolds number of greater than 4,000, a lower effect on the distribution of transition flow having a Reynolds number of between about 2,300 to about 4,000, and very little effect on the distribution of laminar flow having a Reynolds number of less than 2,300.

It is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. A module, comprising:
    a cell stack comprising a plurality of alternating ion depleting compartments and ion concentrating compartments; and
    a housing enclosing the cell stack, the housing comprising:
        an inlet manifold configured to facilitate a flow of fluid into the cell stack, the inlet manifold comprising a first flow distribution system integral to the inlet manifold and configured to promote uniform flow velocity across the cell stack, the first flow distribution system comprising a first ramp and a plurality of radially spaced baffles; and
        an outlet manifold configured to facilitate a flow of fluid out of the cell stack, the outlet manifold comprising a second flow distribution system integral to the outlet manifold, the second flow distribution system comprising a second ramp, the first and the second ramps having different radii of curvature.

2. The module of claim 1, wherein the plurality of radially spaced baffles comprises at least one of ribs and teeth.

3. The module of claim 1, wherein the first ramp is positioned on at least one of a bottom and a top of the first flow distribution system.

4. The module of claim 1, wherein the first flow distribution system is configured to promote uniform fluid distribution to the cell stack.

5. The module of claim 1, wherein the first flow distribution system comprises a plurality of first ramps.

6. The module of claim 5, wherein the plurality of first ramps are spaced to define a plurality of first grooves.

7. The module of claim 1, wherein the second ramp is positioned on at least one of a bottom and a top of the second flow distribution system.

8. The module of claim 1, wherein the second flow distribution comprises a plurality of second ramps.

9. The module of claim 8, wherein the plurality of second ramps are spaced to define a plurality of second grooves.

10. The module of claim 1, wherein the flow velocity of fluid in the cell stack has a variance of less than about +/−20%.

11. The module of claim 10, wherein the flow velocity of fluid in the cell stack has a variance of less than about +/−10%.

* * * * *